March 22, 1927.
H. CUMMER
WEIGHING SCALE
Filed Nov. 30, 1923
1,622,092
3 Sheets-Sheet 1
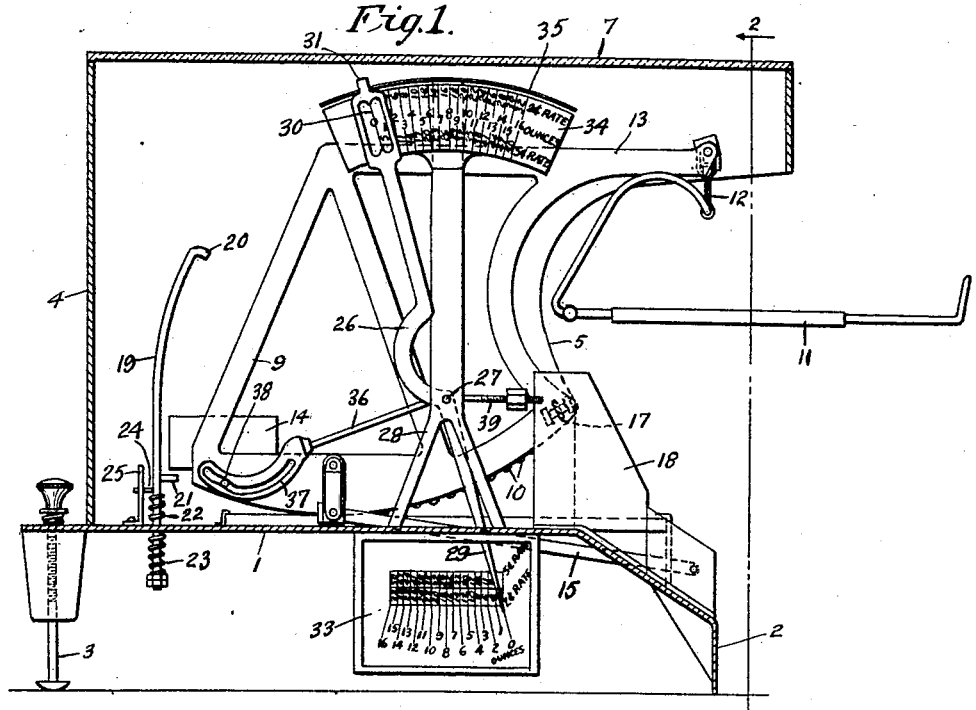
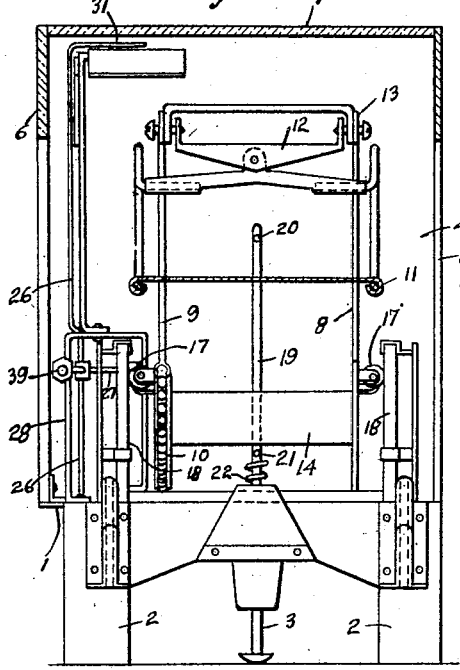
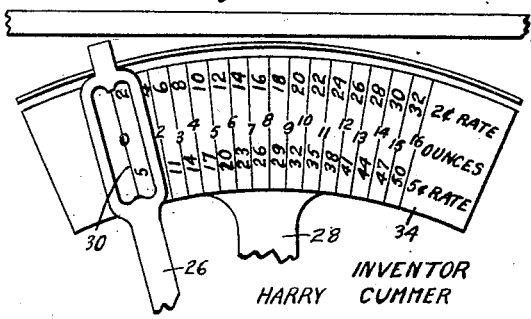
INVENTOR
HARRY CUMMER
by Popp and Powers.
Attys.

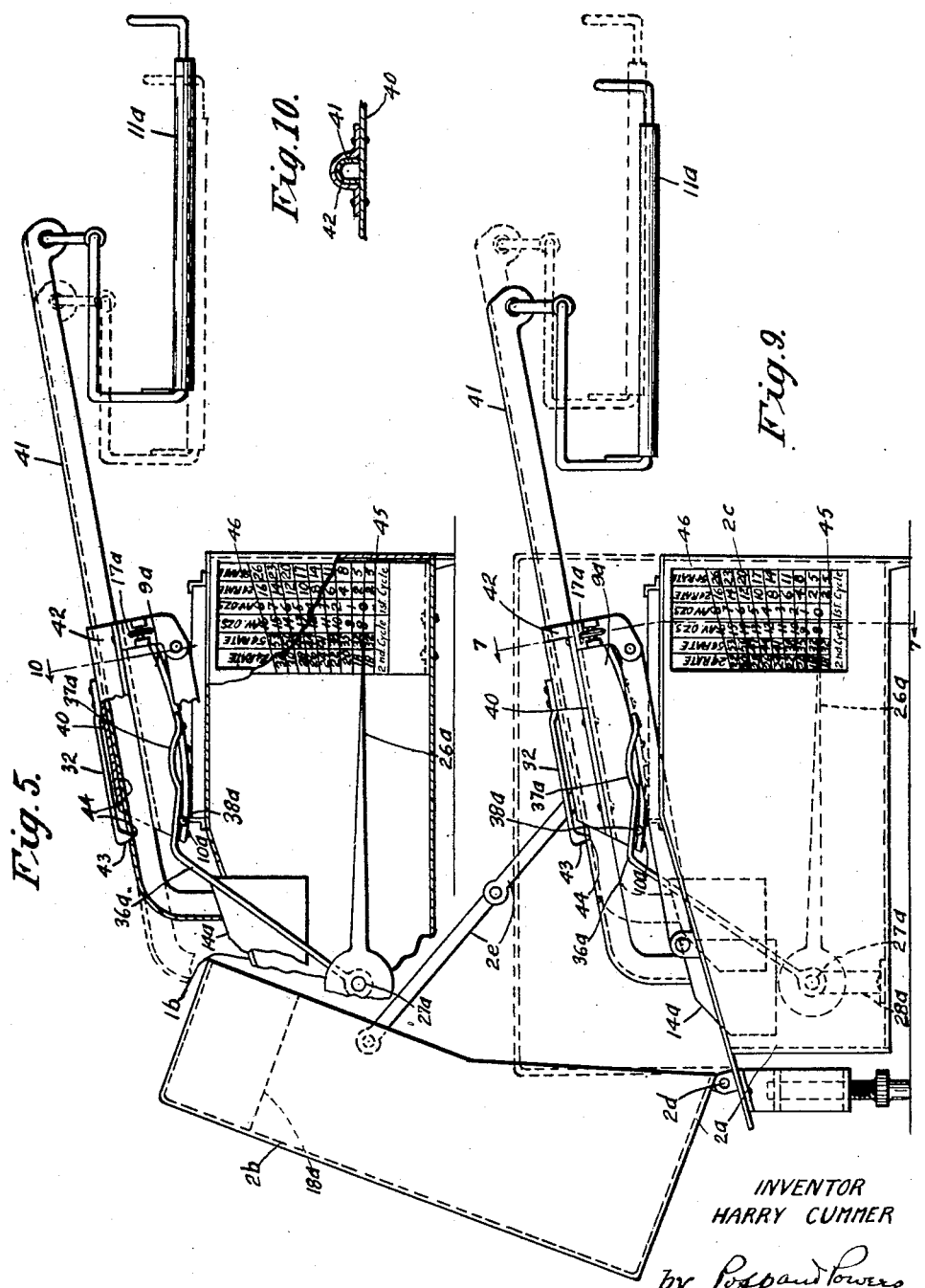

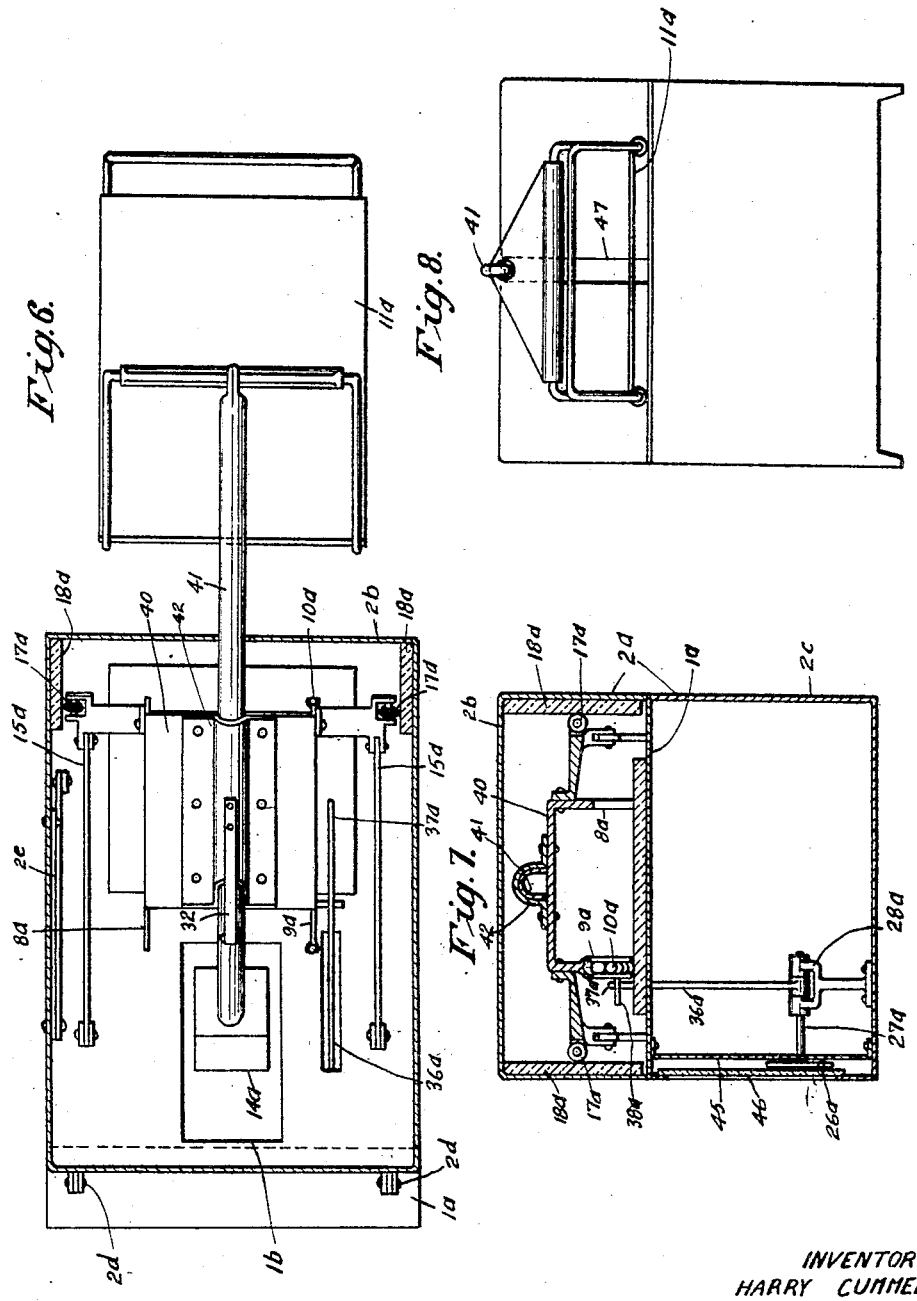

Patented Mar. 22, 1927.

1,622,092

UNITED STATES PATENT OFFICE.

HARRY CUMMER, OF BUFFALO, NEW YORK; HARRY WALES CUMMER AND JOHN W. VAN ALLEN, EXECUTORS OF SAID HARRY CUMMER, DECEASED, ASSIGNORS TO THE CUMMER SCALE COMPANY, INC., A CORPORATION OF NEW YORK.

WEIGHING SCALE.

Application filed November 30, 1923. Serial No. 677,670.

This invention relates to improvements in weighing scales of the type disclosed in my prior United States Patents Nos. 1,076,486 of October 21, 1913, 1,185,634 of June 6, 1916 and 1,451,684 of April 17, 1923. Such type is essentially characterized by rocker beams in parallel planes and by the provision on one or more of the beams of a series of bearing points, the beams tilting from point to point and ultimately coming to rest on two adjacent bearing points of the series.

One object of the invention is to provide an improved indicating mechanism which will be clearly and instantly readable.

A further object is to make simple and effective provision for two or more cycles of operation whereby without increasing the size or weight of the scale its capacity will be at least doubled as compared with a scale of the same size and type as heretofore known.

With the first object in view the invention consists generally in mechanism for positively operating the movable element of an indicator from the beams in such manner that said element will move to an equal extent for each unit of weight value marked on the indicating chart, thereby to provide for an indicating chart whose graduations are equally spaced.

With the second object in view the invention consists generally in the provision of an adjustable part by which the operation of the scale may be made to commence at some determined weight value next in degree above the maximum value of its minimum or initial weighing range whereby the scale may be operated through a weighing range of higher values. To illustrate: The scale may have any desired initial range, say from one to eight ounces, but if the parcel to be weighed is heavier than eight ounces, the adjustable part may be manipulated whereby the operation of the scale will commence at eight ounces and will be effective through a range up to sixteen ounces. In other words an initial and at least one subsequent cycle of operation may be provided for and if the parcel weighed is beyond the range of the initial cycle, the scale may be set for operation through the subsequent cycle.

The invention also consists in various other details of structure and combination which will be set out at length as the description proceeds.

Two forms of the invention are illustrated in the accompanying drawings, the first being shown in Figures 1 to 4 and the second in Figures 6 to 10. In the first form provision for the subsequent cycle of operation is omitted.

In said drawings:

Figure 1 is a vertical longitudinal sectional view of a scale constructed to serve the first object above stated.

Figure 2 is a cross sectional view on the line 2—2 of Figure 1.

Figure 3 is a detail view of an indicator visible from the top of the scale.

Figure 4 is a detail view of an indicator visible from the side of the scale.

Figure 5 is a view partly in vertical longitudinal section and partly in side elevation of a scale constructed to serve both of the objects above stated.

Figure 6 is a plan view of the same, partly in horizontal section.

Figure 7 is a cross section on the line 7—7 of Figure 9.

Figure 8 is a front elevation of the same.

Figure 9 is a side elevation of the same wherein adjustment has been made to provide for the subsequent cycle of operation.

Figure 10 is a detail sectional view on the line 10—10 of Figure 5.

Referring to Figures 1 to 4:

The operating parts are mounted on a suitable base 1 provided at its front end with supporting legs 2 and at its rear end with an adjustable supporting leg 3 by means of which the elevation of the base may be adjusted to insure accuracy. For the purpose of protection the mechanism is preferably enclosed in a suitable casing 4 which is open at its front as at 5 and which includes a transparent glass side wall 6 and a transparent glass top 7.

The operating mechanism includes connected rocker beams 8 and 9 arranged in vertical parallel planes and having curved treads, the tread of the beam 9 being preferably provided with ball points 10, as shown in my Patent No. 1,451,684 of April 17, 1923. The scale pan 11 is accessible through the front opening 5 of the casing 3 and is suspended from a cross bar 12 carried by forwardly extending arms 13 of the rocker beams, a suitable counterbalance 14 for the scale pan being mounted between the rear ends of the rocker beams. As shown in my Patent No. 1,185,634 of June 6, 1916, links or rods 15, operating through slots in the base 1, are pivoted at their ends to the base and to the rocker beams, and these links, without interference with the free rocking of the beams, tie the beam to the base so as to always retain it in proper position thereon and prevent the removal of the scale from the base. The rocker beams may also be provided at the front ends of their tread portions with laterally projecting guide rollers 17 which bear against guide plates 18, preferably of glass. Means is preferably provided for limiting the movement of the rocker beams in either direction, such means conveniently comprising a bar 19 having upper and lower lugs 20 and 21 for engagement by the counter-weight 14 in either direction of movement of the rocker beams. The bar 19 projects through an opening in the base and is vertically yieldable, being maintained in equilibrium by opposed cushioning springs 22 and 23 arranged above and below the base. The bar 19 is suitably held against turning movement whereby its lugs 20 and 21 will always lie in the path of the counterweight 14 or equivalent engaging part movable with the rocker beams, the means employed conveniently consisting of a projection 24 on said rod operating in a guide slot formed in a lug 25 secured to the base 1.

The scale includes indicating means which may serve also as a price indicator. The indicating means is shown in a form suitable for postal scales but may of course be selected for any particular use for which the scale may be desired. The indicating means consists of a co-operating pointer and chart constituting companion relatively movable elements and either element may be movable, the other being stationary. As shown the pointer is movable and the chart is stationary. The pointer is provided on an arm 26 mounted in a shaft 27 journalled in a supporting bracket 28. As a measure of convenience two or more pointers and co-operating charts visible from different angles or elevations may be provided. Thus the arm 26 has at its lower end a vertically disposed pointer 29 and at its upper end a vertically disposed pointer 30 and a horizontally disposed pointer 31. The pointer 29 is movable through a slot in the base 1 and co-operates with a chart 33 mounted below said base; the pointer 30 is in the form of a loop provided with a cross wire as the indicating part and co-operates with a chart 34; and the pointer 31 co-operates with a chart 35. The charts 34 and 35 are conveniently mounted on the bracket 28. The charts 33 and 34 are visible when the scale is viewed at the side adjacent which said charts are located and are used according to the elevation at which the scale is supported. The chart 35 is visible through the glass top 7 of the casing 4 and is used when the scale is arranged below the level of the eyes. The charts are similarly constructed and as adapted for postal work are graduated in ounces with indications adjacent each ounce reading of the corresponding amount of postage calculated at the rate per ounce according to the particular class of postal matter being weighed.

The arm 26 is operated from the rocker beams by mechanism of such nature that the stages of movement of said arm corresponding to the stages of movement of the beams 9 from point to point are of equal extent, thereby to insure that the arm 26 will move to an equal extent for each unit of weight value marked on the indicating chart and hence to permit of the graduations of said chart being equally spaced. Such equal spacing of the graduations of the chart promotes facility and accuracy in reading the same. The operating mechanism consists of an arm 36 mounted on the shaft 27 and provided at its outer end with a cam slot 37 in which engages a pin 38 mounted on the rocker beam 7, the shaft 27 being also provided with a weighted arm 39 extending oppositely from the arm 36 and serving to counterbalance the same. As the rocker beam 7 moves forward under the weight of the letter or parcel on the scale pan the pin 38 moves toward the inner end of the slot 37 and rocks the arm 36, thereby rocking the shaft 27 and the arm 26. The slot 37 is of such outline that the stages of movement of the arm 26, corresponding to the stages of movement of the beam 7 from point to point, will be of equal extent. When the scale is at zero the pin 38 is located a short distance from the outer end of the slot 37, thereby to provide a clearance in which said pin may play when the rocker beam, on its return movement, moves momentarily beyond its normal or initial zero position.

Referring to Figures 5 to 10:

In this form the casing $2^a$ includes an upper chamber $2^b$ and a lower chamber $2^c$. These chambers are separated by the base $1^a$ which is removably mounted and forms the top wall for the lower chamber; and the upper portion of the casing $2^a$ by which the upper chamber $2^b$ is delimited is hinged as at $2^d$ to a rearward extension of the base. The hinged upper portion of the casing may thus be raised to give access to the parts within the upper chamber $2^b$ and may be held in raised position by alining supporting arms $2^e$ pivoted to one another and to the base and the hinged part of the casing respectively.

The rocker beams 8ª and 9ª operate on the base 1ª in the manner above described, the beam 9ª being provided with the ball points 10ª. These beams are formed as parts of a channel member 40 which is held to the base by links 15ª corresponding functionally to the links 15 previously described. The rocker beams may also be guided in their movements by rollers 17ª operating upon guide plates 18ª mounted upon the hinged portion of the casing.

The invention includes means adjustable relatively to the rocker beams for varying the weight required to produce a movement of said beams. As shown and preferred an arm 41 is mounted longitudinally of the channel member 40 in a retaining clip 42 and projects forwardly and rearwardly from said member. At its front end the arm 41 supports the scale pan 11ª and at its rear end said arm supports the counterweight 14ª, the base 1ª having an opening 1ᵇ through which the counterweighted end of the arm 41 projects. The arm 41 is adjustably movable lengthwise of the channel member and in the embodiment shown two positions of said arm are provided for, the arm being retained in either position by the engagement of a spring dog 43 mounted on the clip 32 in a notch 44 formed in said arm, two of said notches, one for each position of said arm being provided. In the first or forward position of the arm 41 the scale operates through an initial range of values and in the second or rearward position of said arm through a subsequent range of values. In Figure 5 the arm is shown in full lines in its forward position and in Figure 9 it is similarly shown in its rearward position.

The indicating means consists of a co-operating pointer 26ª and chart 45. The chart has two tables of values, one for the initial range and which may be called the initial table and the other for the subsequent range and which may be called the subsequent table. In the forward position of the arm 41 the scale is operative only as to the initial range whereas in the rearward position it is operative as to the subsequent range. In the construction shown the pointer 26ª returns to its initial position at the beginning of the operation through the subsequent range. Hence, the first value of the subsequent table is placed adjacent the zero of the initial table. Thus it may be assumed that the initial table covers eight ounces, the readings being 0 to 8 and that the subsequent table covers eight ounces, the readings being 8 to 16; in such a case the numeral 8 of the subsequent table may adjoin the zero of the initial table and in like manner the numeral 9 of the subsequent table will adjoin the numeral 1 of the initial table and so on throughout the series. As in the preceding constructions postal values calculated on the rate applicable to the letter or parcel being weighed may be placed adjacent the weight values so as to obtain the advantage of automatic computation.

If the weight of the letter or parcel be less than eight ounces the scale is operated with the arm 41 in its forward position and the reading is taken from the initial table but if the letter or parcel weigh between eight and sixteen ounces the arm 41 is adjusted to its rearward position and the reading is taken from the subsequent table. The adjustment of the arm 41 to its rearward position causes a repetition of the forward movement of the rocker beams from the initial position thereof corresponding to the zero of the initial scale, the extent of such repeated forward movement depending, of course, upon the weight of the letter or parcel on the scale pan. It will of course be apparent that the scale may have in its initial and subsequent ranges any desired capacity within practical limits and that more than one subsequent range may be provided for if so desired, in which case a corresponding number of positions of the arm 41 will be provided for.

The pointer 26ª, as in the preceding embodiment, is operated from the rocker beams in such manner that its stages of movement, corresponding to the movements of the beam 9ª from point to point, are of equal extent, thereby to permit an equal spacing of the graduations of the chart 45 which, together with the end of the pointer, is exposed to view through a window or opening 46 in the adjacent side wall of the chamber 2ᶜ in which the pointer is arranged. The pointer 26ª is mounted upon a shaft 27ª arranged in the chamber 2ᶜ and journalled in a bracket 28ª. The operation of the pointer is produced by an arm 36ª fitted upon the shaft 27ª and projecting through a slot in the base 2ª above which it is provided with an extension 37ª of curved form to co-operate as a cam with a pin 38ª projecting laterally from the beam 9ª, the extension 37ª resting upon the pin 38ª and having its cam curvature selected to provide for the described operation of the arm 26ª.

In Figures 5 and 9 the upper portion of the casing is shown in its raised position merely in order to expose to view the parts arranged in the chamber 2ᵇ and said upper portion may be so raised whenever it may be desired to gain access to the mechanism; but in ordinary use the scale is operated with its upper portion lowered to enclose the rocker beams and their associated parts as shown in Figures 7 and 8, the arm 41 in such case operating through a vertical slot 47 in the front wall of the upper portion of the casing.

It will be understood that the invention is not confined to precise structural details of the forms shown but that modifications may be resorted to within the scope of the appended claims.

Having fully described my invention, I claim:

1. In a weighing scale of the type which includes a rocker beam, an indicating means comprising as companion co-operating elements a pointer and a chart, one of said elements being movable and the other being stationary, and cam means influencing the movement of the movable element from the rocker beam whereby said element will move to an equal extent for each unit of weight value marked on said chart.

2. In a weighing scale of the type which includes a rocker beam having its thread provided with a series of bearing points, an indicating means comprising as companion co-operating elements a pointer and a chart, one of said elements being movable and the other being stationary, and cam means influencing the movement of the movable element from the rocker beam whereby the stages of movement of said element, corresponding to the movements of the beam from point to point, are equal.

3. In a weighing scale of the type which includes a rocker beam, an indicating means comprising as companion co-operating elements a pointer and a chart, one of said elements being movable and the other being stationary, and means for operating the movable element from the rocker beam comprising an arm operatively connected with said pointer and having a part formed as a cam and a projection on said beam co-operating with said cam whereby said element will move to an equal extent for each unit of weight value marked on said chart.

4. In a weighing scale of the type which includes a rocker beam having its tread provided with a series of bearing points, an indicating means comprising as companion co-operating elements a pointer and a chart, one of said elements being movable and the other being stationary, and means for operating the movable element from the rocker beam comprising an arm operatively connected with said pointer and having a part formed as a cam and a projection on said beam co-operating with said cam whereby the stages of movement of said element, corresponding to the movements of the beam from point to point, are equal.

5. In a weighing scale of the type which includes a rocker beam, an indicating means comprising as companion co-operating elements a pointer and a chart, one of said elements being movable and the other being stationary, a shaft on which the movable element is mounted, and means for operating the movable element from the rocker beam comprising an arm mounted on said shaft and a projection on said rocker beam engaging said arm.

6. In a weighing scale of the type which includes a rocker beam, an indicating means comprising as companion co-operating elements a pointer and a chart, one of said elements being movable and the other being stationary, a shaft on which the movable element is mounted, an arm mounted on said shaft and having an extension, and a projection on said rocker beam engaging said extension, the latter being formed as a cam whereby said element will move to an equal extent for each unit of weight value marked on said chart.

7. In a weighing scale of the type which includes a rocker beam, means adjustable relatively to said beam for varying the weight required to produce a movement of said beam, a chart having at least two tables of weight values of different range, said tables being severally used according to the adjustment of said means, and a pointer operated by the movement of said beam and co-operating with said chart in any adjustment of said means.

8. In a weighing scale of the type which includes a rocker beam, an arm mounted for adjustment lengthwise of said beam and having at least two positions, a scale pan supported at the front end of said arm, a counterweight supported at the rear end of said arm, a chart having at least two tables of weight values of different range, said tables being severally used according to the adjustment of said means, and a pointer operated by the movement of said beam and co-operating with said chart in either position of said arm.

In testimony whereof I affix my signature.

HARRY CUMMER.